United States Patent
Joseph et al.

(10) Patent No.: US 12,520,218 B2
(45) Date of Patent: Jan. 6, 2026

(54) SPATIALLY AWARE CELLS

(71) Applicant: QUALCOMM Incorporated, San Diego, CA (US)

(72) Inventors: Binil Francis Joseph, Hyderabad (IN); Bapineedu Chowdary Gummadi, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 390 days.

(21) Appl. No.: 17/831,629

(22) Filed: Jun. 3, 2022

(65) Prior Publication Data

US 2023/0397063 A1    Dec. 7, 2023

(51) Int. Cl.
*H04W 36/32* (2009.01)
*G06T 19/00* (2011.01)
*H04W 36/00* (2009.01)

(52) U.S. Cl.
CPC ......... *H04W 36/324* (2023.05); *G06T 19/006* (2013.01); *H04W 36/0061* (2013.01); *H04W 36/008375* (2023.05)

(58) Field of Classification Search
CPC ....... H04W 36/00837; H04W 36/0061; H04W 36/32
USPC ........................................................ 455/438
See application file for complete search history.

(56) References Cited

U.S. PATENT DOCUMENTS

| | | | |
|---|---|---|---|
| 2004/0165561 A1* | 8/2004 | Chiou | H04W 16/22 370/338 |
| 2005/0002662 A1* | 1/2005 | Arpa | H04N 7/181 396/120 |
| 2017/0076479 A1* | 3/2017 | Benavides | B61L 25/02 |
| 2018/0004308 A1* | 1/2018 | McCulloch | G06F 3/0346 |
| 2019/0289505 A1* | 9/2019 | Thomas | H04W 36/08 |
| 2022/0299635 A1* | 9/2022 | Sergeev | G01S 17/87 |

* cited by examiner

*Primary Examiner* — Joel Ajayi
(74) *Attorney, Agent, or Firm* — Dinsmore & Shohl LLP

(57) ABSTRACT

Certain aspects of the present disclosure provide techniques for obtaining first mobility information for a user equipment (UE) based on data from one or more sensors, predicting a path of the UE, based on the first mobility information, and triggering handover of the UE from the source network entity to a target network entity, based on cell coverage information and the predicted path of the UE.

24 Claims, 10 Drawing Sheets

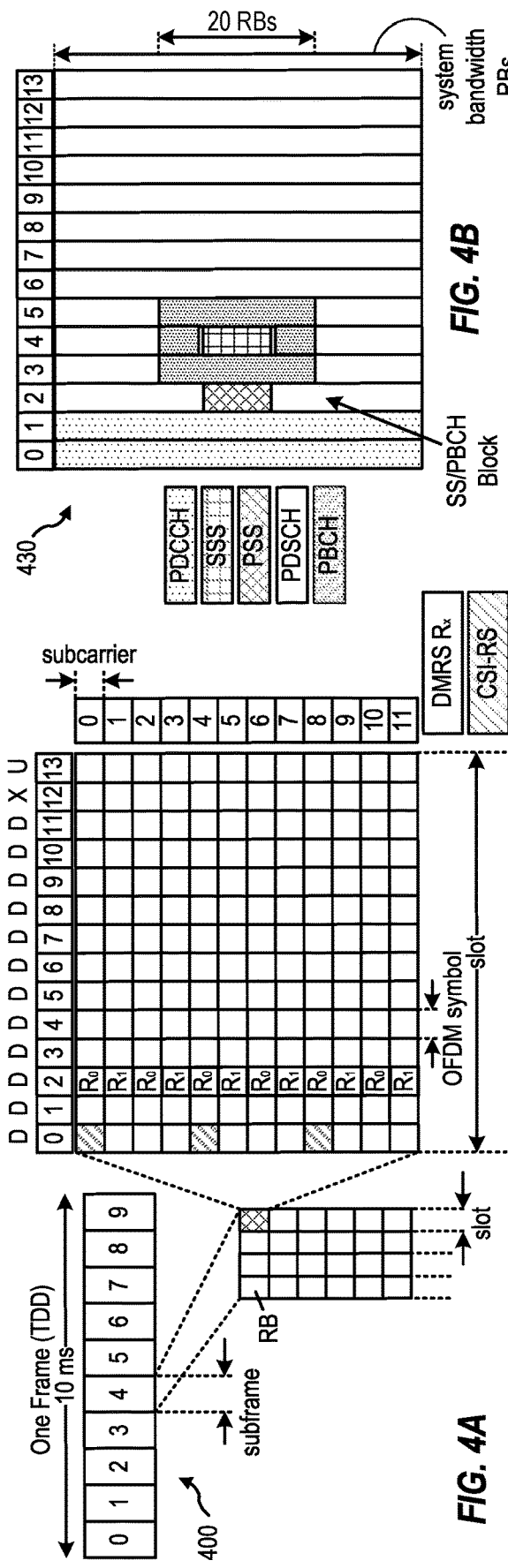
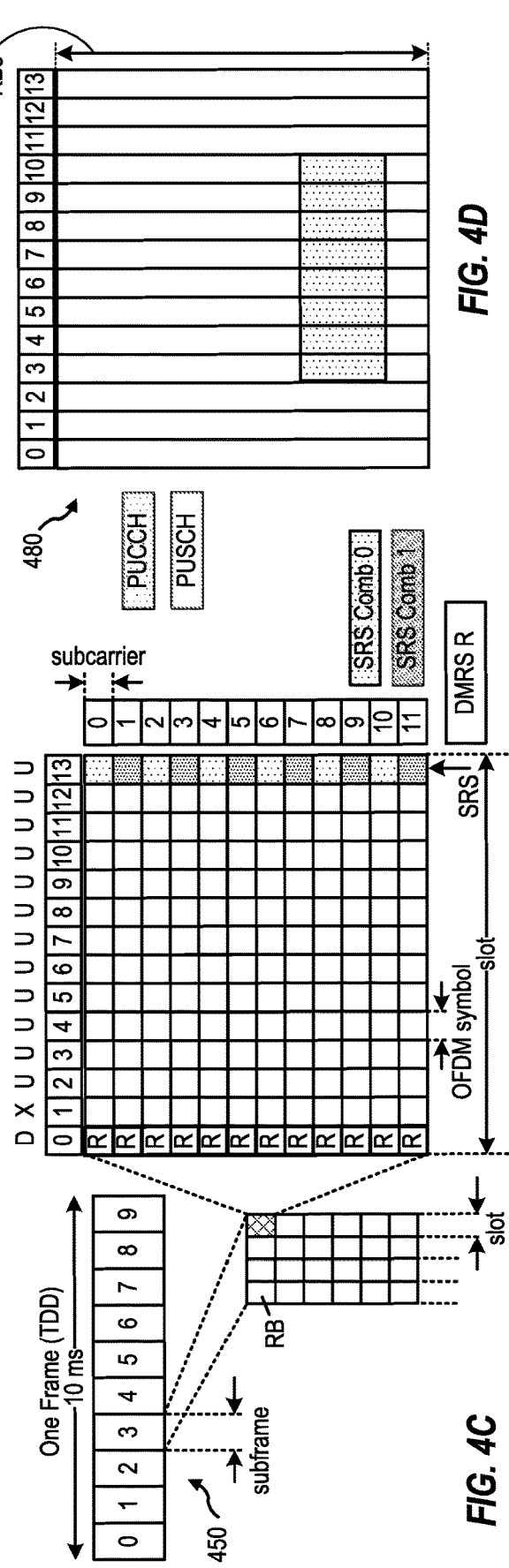

SPATIALLY AWARE CELLS

BACKGROUND

Field of the Disclosure

Aspects of the present disclosure relate to wireless communications, and more particularly, to techniques for enabling spatially aware cells.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method of wireless communications by a source network entity. The method includes obtaining first mobility information for a user equipment (UE) based on data from one or more sensors; predicting a path of the UE, based on the first mobility information; and triggering handover of the UE from the source network entity to a target network entity, based on cell coverage information and the predicted path of the UE.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

DETAILED DESCRIPTION

Figure 1:
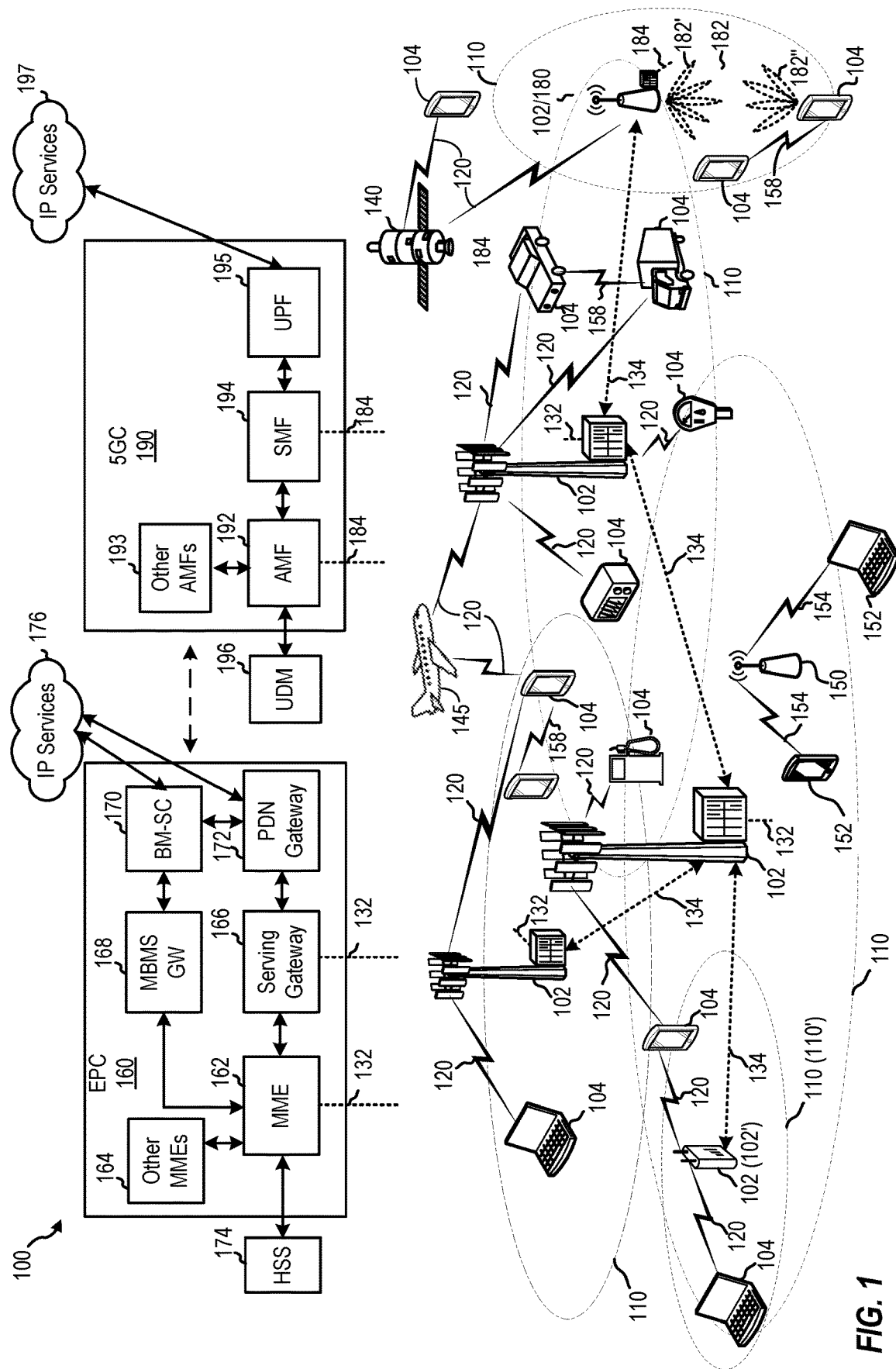
FIG. 1 depicts an example wireless communications network.

Aspects of the present disclosure provide apparatuses, methods, processing systems, and computer-readable mediums for enabling spatially aware cells. For example, cameras (and/or other types of sensors) may be incorporated into network entities to provide mobility information to predict a future path of a user device, such as a user equipment (UE), and facilitate a handover.

Advances in wireless technology support ever increasing data rates for growing numbers of users. The increase data rates help support a variety of services, such as video streaming, as well as traffic from Internet-of-Things (IoT). Millimeter wave (mmWave) frequencies, due to large available bandwidth (100s of Mhz), can be used to achieve high throughput in both uplink and downlink directions.

mmWave signals are highly directional and the propagation characteristics present certain challenges and can experience high path loss over short distances. For example, a phenomenon known as low knife-edge diffraction (that occurs when a mmWave strikes a sharp edge and bends) may cause the non-line of sight radio link to be very weak. High absorption and building penetration also makes reflected paths of mmWave signals poor. Even attenuation due to foliage is significant enough to cause radio link failure (RLF) at mmWave frequencies.

In current mmWave technology, the radio link is maintained based on power measurements taken by a UE of various reference signals (RSs), such as synchronization signal blocks (SSBs) or channel state information reference signals (CSI-RS), transmitted on certain beams. In such cases, the UE measures RS power for a serving cell and/or neighboring cells and reports the measured powers, based on which cells might have conditions that trigger handovers.

Unfortunately, existing beam management techniques may be unreliable with frequent radio link failures (RLFs) resulting in poor and unpredictable user experiences. This may be particularly true in conditions where the user is moving (e.g., rounding a corner) or in conditions of dynamic transmission or reception (Tx/Rx). Existing techniques that rely on past measurements may cause frequent radio link failures (RLFs) in mmWave, because the UE will not be able to anticipate sudden changes in the radio link, due to the propagation characteristics of mmWave.

Aspects of the present disclosure, however, provide mechanisms that may help anticipate such sudden changes and take appropriate action to avoid or speed recovery from an RLF. For example, sensors incorporated into network entities may provide mobility information that allows a future path of a UE (and corresponding changes in the radio link) to be predicted. Based on the prediction, the UE may be handed over to another cell before the RLF occurs, which may help maintain connectivity and improve overall user experience.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
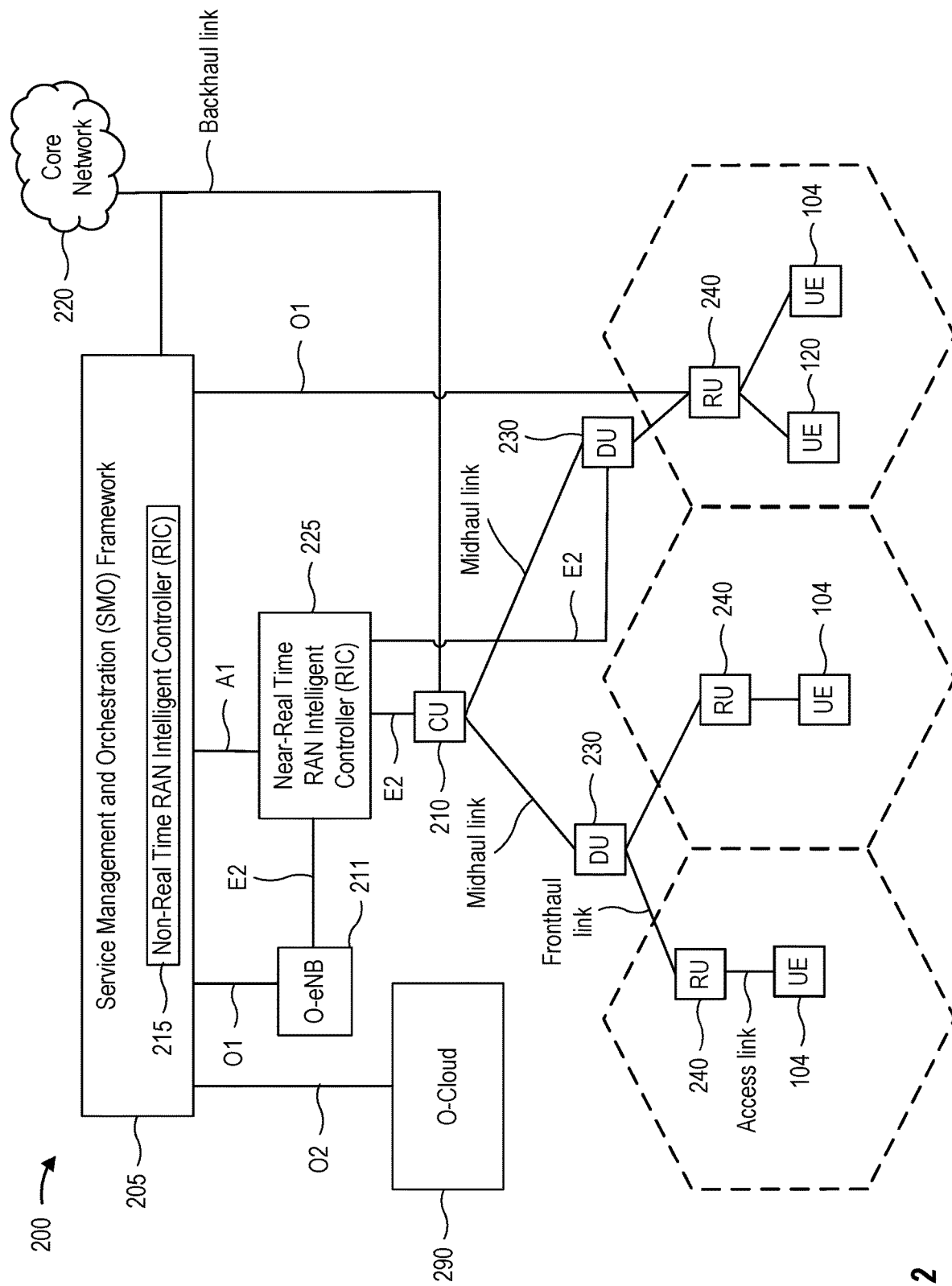
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave (or near mmWave) radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) MC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium.

Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT MC 215 or the Near-RT MC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
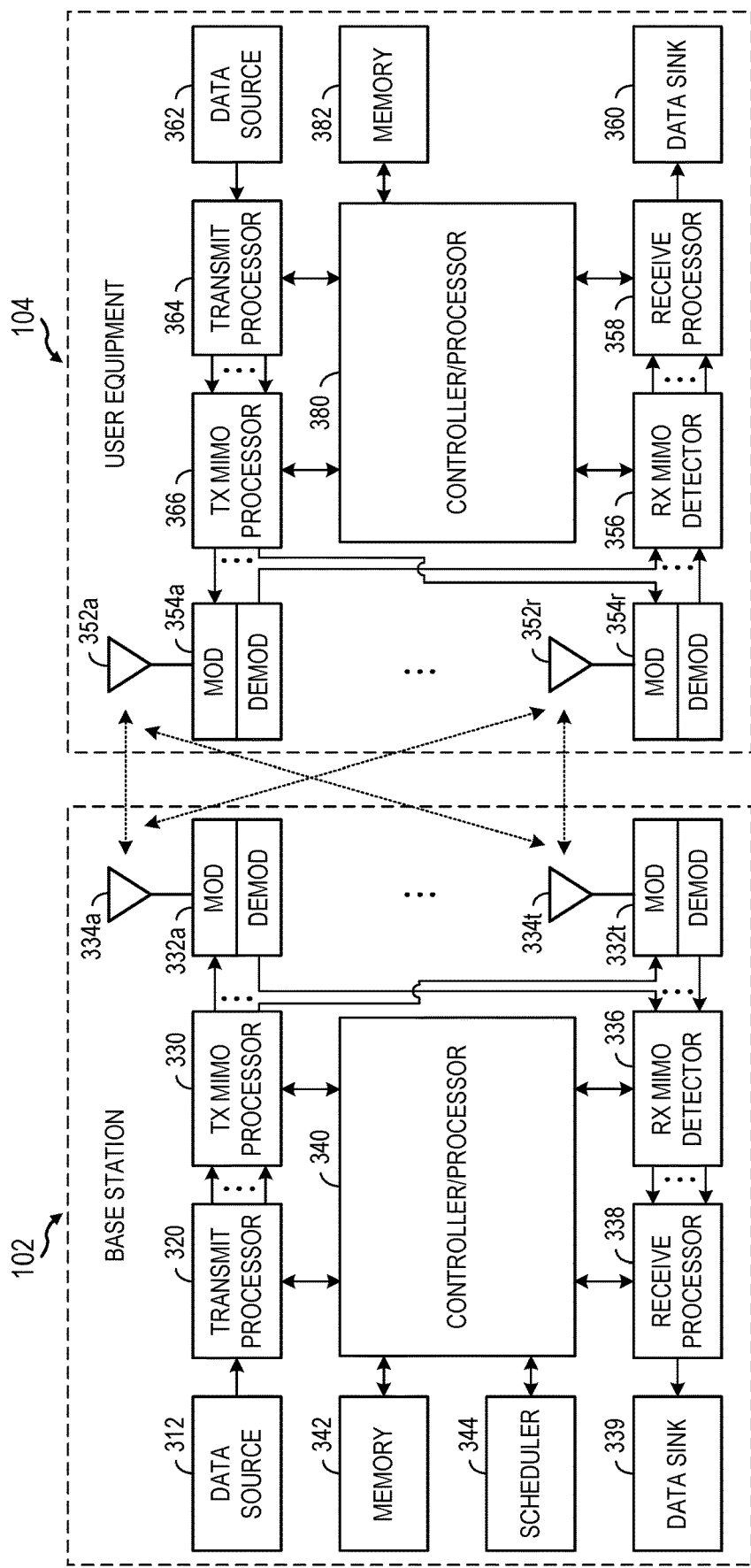
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIG. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Enabling Spatially Aware Cells

Aspects of the present disclosure provide mechanisms that may help a network entity (e.g., a base station, such as a gNB) anticipate such sudden changes and take appropriate action to avoid or speed recovery from a radio link failure (RLF).

For example, sensors incorporated into network entities may effectively make cells spatially aware. In this context, spatially aware generally refers to the ability the sensor information may enable for a cell to predict a future path of a UE. Based on the prediction, the UE may be handed over to another cell (and/or switched to another beam in the same cell) before a radio link failure RLF occurs, which may help maintain connectivity and improve overall user experience.

Please note that the terms gNB, TRP (Transmission and reception points) and RRH(Remote Radio Heads) are all examples of network entities in different deployment models and these terms may be used interchangeably as the solution is applicable in any of these deployment models.

As noted above, the directionality and propagation characteristics of mmWave signals present certain challenges, as the signals can experience high path loss over short distances. As a result, current radio link management techniques, that rely on past UE measurements can cause frequent radio link failure (RLF) in mmWave because UE will not be able to anticipate sudden changes in the radio link.

Figure 5:
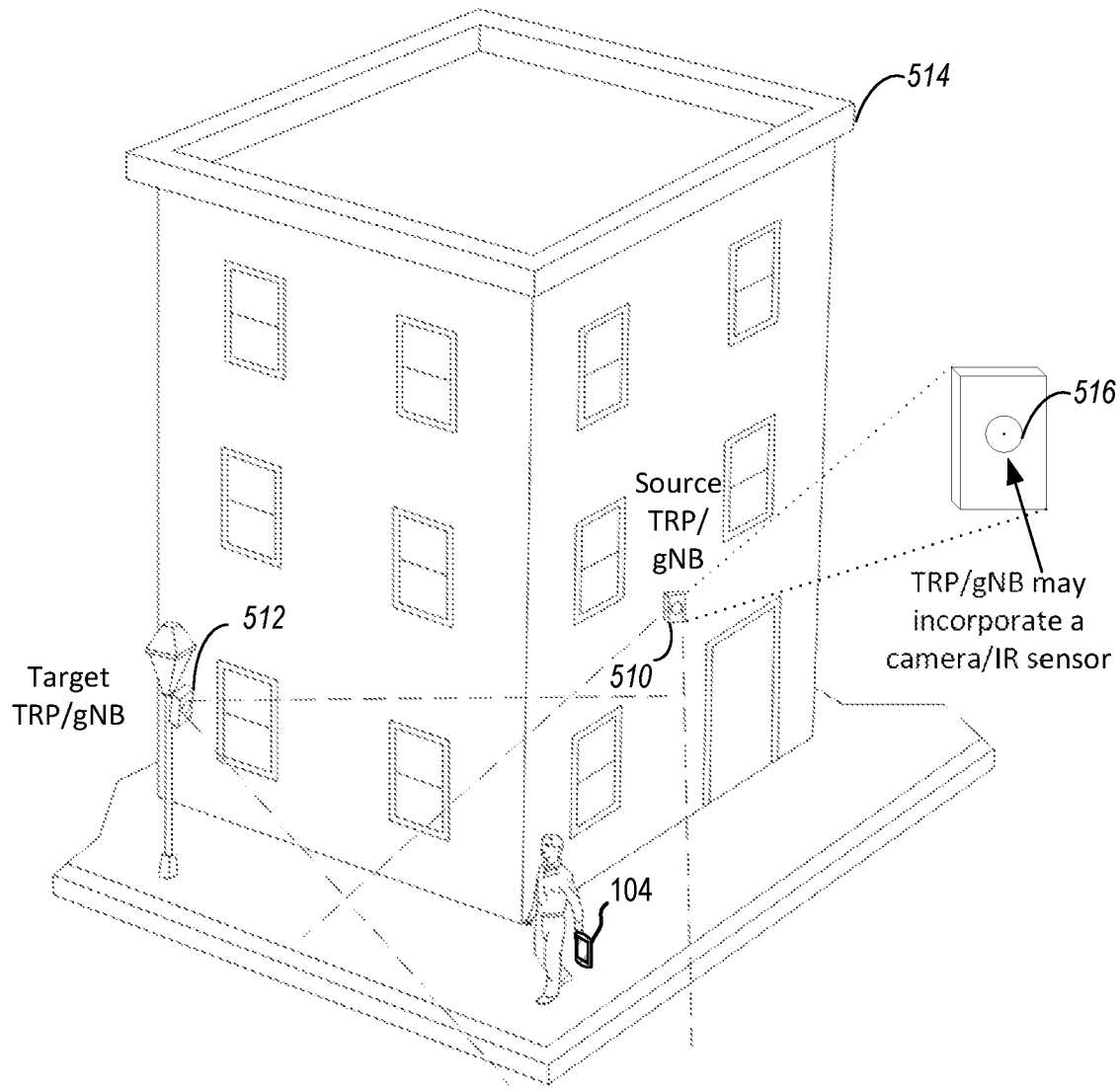
FIG. 5 depicts an example scenario in which aspects of the present disclosure may be utilized.

This challenge may be understood with reference to FIG. 5, which depicts a typical urban scene with mmWave base stations (e.g., transmitter receiver points (TRPs) or gNBs, such as source gNB 510 and target gNB 512) deployed across blocks on lampposts and billboards for fair coverage. In the illustrated example, a user is moving towards the corner of a building 514 with a phone 104 in connected mode NR 5G.

As the user approaches the corner, the source gNB may be serving the UE, since the UE was its LOS (Line of Sight). The target gNB may be being measured by the UE, but the radio quality may be much less than the source gNB (e.g., due to distance), so a handover may not be considered.

With conventional radio link management, as soon as the user goes around the corner of the building, towards the target gNB) a radio link failure (RLF) may be triggered as the Source gNB will go non-Line of sight due to poor diffraction and reflective properties of mmWave. Since the drop of source gNB link quality is abrupt, there may not be sufficient time to trigger neighbor measurements and measurement reporting to initiate hand-over to target gNB whose link quality will be better than source gNB around the corner.

Aspects of the present disclosure, however, may help avoid this type of scenario, through the use of sensors 516, such as the target and source gNBs. Using mobility information provided by the sensors, the gNBs may be able to predict the future path of the UE.

The sensors 516 may be image sensors (such as cameras), infra-red (IR) sensors (e.g., to enhance night vision), or radar-based sensors. As illustrated, in some cases, sensors 516 may be incorporated into the gNB or other type of network entity, such as a remote radio head (RRH) or TRP.

Aspects of the present disclosure provide techniques for incorporating cameras and/or IR (for enhanced night vision) sensors into the radio head/gNodeB and using mobility information from these sensors to predict the future path of the UE.

Figure 6:
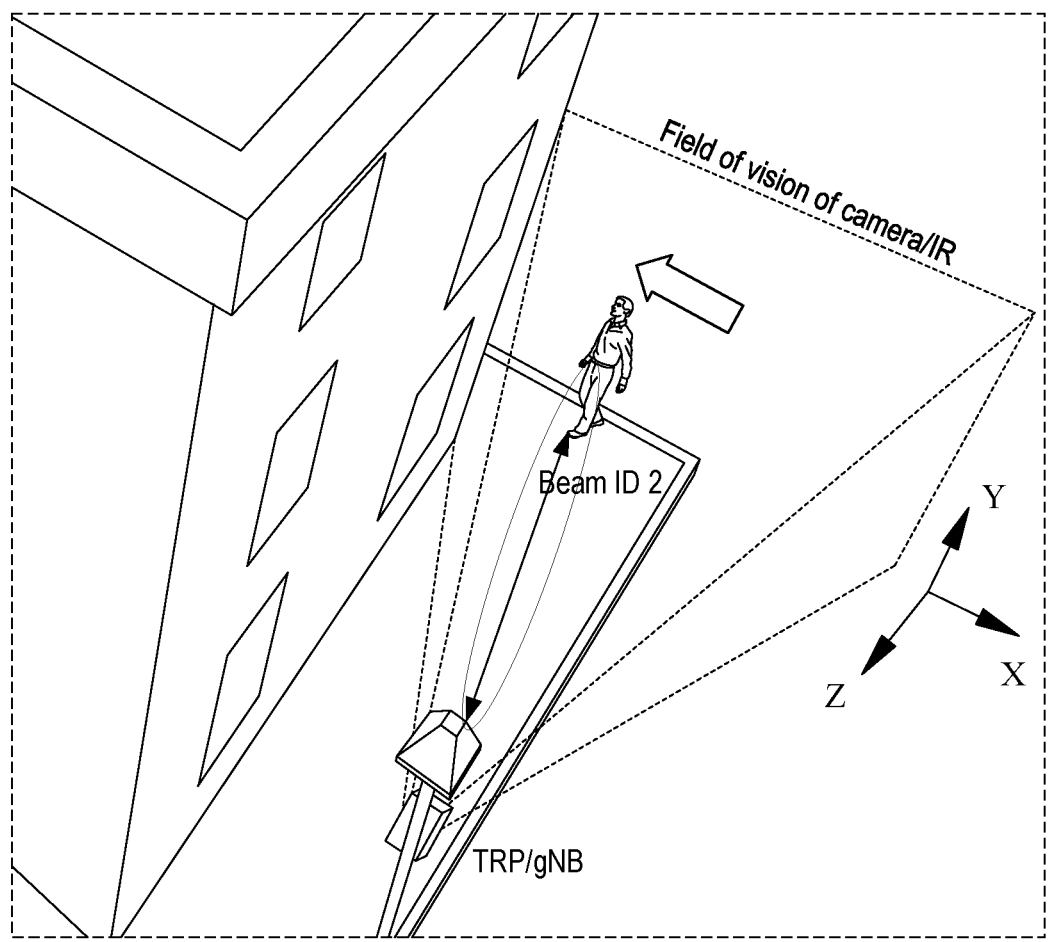
FIG. 6 depicts an example scenario in which aspects of the present disclosure may be utilized.

Since mmW and visible light/IR propagation properties are closely correlated, a camera feed can provide meaningful insight to the gNB coverage environment. For example, as illustrated in FIG. 6, a camera field of vision may be able to track a user walking by a building, within line of site (LOS) of a gNB.

As described above, with conventional radio link management, an RLF might occur as the mobile user walks behind the building. In the illustrated example, the gNB may have been able to switch beams (e.g., from beam ID 1, to beam ID 2, to beam ID 3) as the user walks. However, because the gNB has no coverage behind the building, the UE is subject to RLF as the user continues that way.

Predicting the future path of the UE, as proposed herein, may help avoid this RLF scenario. According to certain aspects, a first step in predicting the UE path may be to build a model of the field of view (FOV) of gNB environment. In some cases, a current FOV may be created by superimposing image data on to a 3-dimensional (3D) model of the FOV of the gNB.

In some cases, the 3D model may be obtained by fetching map data (e.g., from a location server) via an application programming interface (API). Since, in typical deployments, the gNB location is static, such a 3D map fetch may be performed relatively rarely in frequency.

The view from the camera (and/or IR sensor) may be super imposed on to the 3D model to create a live 3D view layout of gNb FOV. The visual layout may strongly correlate to a mmWave propagation map, as noted above, due to its propagation characteristics which makes mmWave link sustainable mostly on direct LoS.

The 3D view of the layout may be relatively low resolution, since obstructions for LoS are of most interest. The 3D model can be further refined, for example, via reinforced learning from UE behaviors (as opposed to gNB predictions of the 3D model). In some cases, visual feeds from other neighboring gNBs can also be used to refine the 3D model, in case of a centralized solution.

Figure 7:
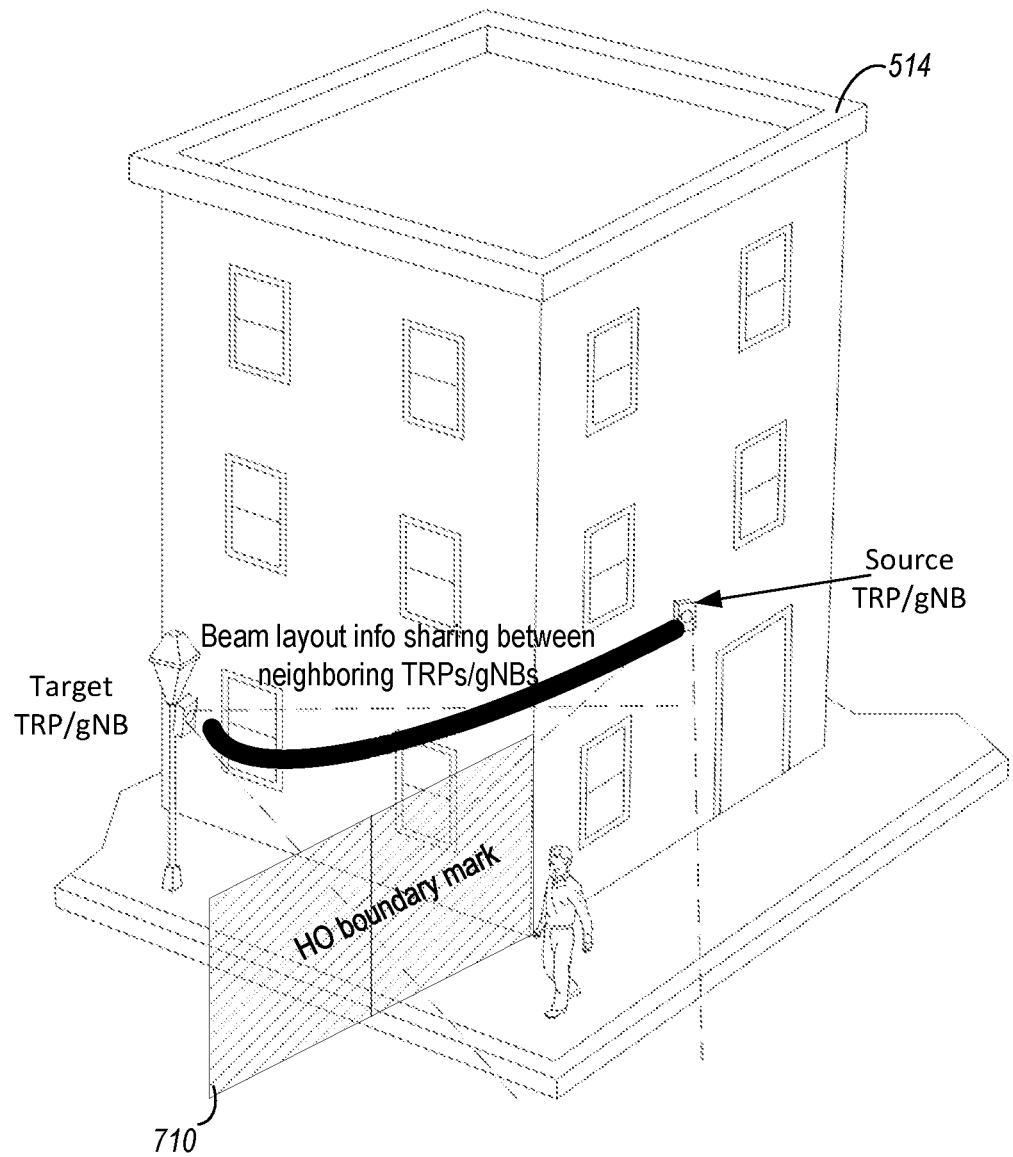
FIG. 7 depicts an example scenario in which aspects of the present disclosure may be utilized.

A second step in predicting the UE path may involve sharing of cell coverage layout between neighboring TRP/gNBs. For example, in a scenario such as illustrated in FIG. 7, the cell coverage layout of neighboring gNBs may be shared with each other via existing Self Optimized Networks (SON) frameworks. This shared layout information may help the target TRP/gNB to mark boundaries in its 3D visual field for potential handovers (e.g., such as HO boundary 710).

A third step in predicting the UE path may involve non-visual deduction of the positioning and velocity of UE. As an example of such non-visual deduction, the location and velocity of the UE may be calculated based on the radio link (e.g., based on changes in received power from a UE may indicate distance of the UE from the gNB and increases/decreases in received power may indicate changing directions and/or speed).

In some cases, the direction of motion and location (e.g., in the 2D X-Y plane) of the UE can be derived from a sequence of transmit (Tx) beam switches at the gNB. In other words, since the gNB is aware of the direction of each beam (e.g., from Beam characteristics tables), switching of beams in a certain sequence (e.g., from beam ID1, to beam ID2, to beam ID 3) may translate to a motion in a certain direction (in the X dimension). When a UE is connected mode, relatively narrow, refined, beams are typically used. Thus, the precision of these derived deductions may be relatively high. In addition, the angle of arrival of uplink (UL) beams can also be used to increase the accuracy of deduction.

Various parameters can be used to deduce the position of UE in the Z-X plane (in a direction radial to the gNB). For example, Time Difference of Arrival (TDOA) of UL receptions can indicate the distance of the UE from the gNB. TDOA can be derived from the existing timing advance (TA) calculation mechanisms. As another example, a change in received (Rx) power from the UE may indicate distance of the UE from the gNB. For example, an increase in power generally translates to UE motion towards the gNb, due to reduction of pathloss, while a decrease in power generally translates to UE motion away from the gNb. As another example, power information can be derived from the inner loop power control mechanism in gNB for uplink. As another example, a Doppler shift in the UL Rx frequency can be used for calculating the relative velocity. A combination of these various parameters, along with the direction of the beam, can be used to calculate (estimate) the location of UE in z-x plane.

A fourth step in predicting a future UE path may involve building a relationship between the UE position and velocity (e.g., determined from the third step) with the 3D visual model of the gNB FOV (determined in the first step).

In some cases, this relationship may be built by correlating the user movements in view of a camera to the UE position and velocity. As a result, the UE identity can be tagged to the moving entity in the visual field.

In some cases, a computer vision algorithm be used to identify a nature of a moving entity (e.g., if the moving entity is a car or a person). Such identification of a moving entity may suffice for the purposes of path prediction. The ability to use this type of identification (as opposed to a higher resolution image processing) may help in reducing the required computation power and also allow the use of a relatively low-cost, low-resolution camera. If a system has access and ability to use visual feeds from other neighboring gNB cameras, a more accurate 3D model of the environment can optionally be generated.

A fifth step in predicting a UE path may involve tracking the UE position and motion for potential hand-overs (HOs).

This may involve identifying potential target gNBs, based on the UE position and velocity, as tracked within the 3D visual field of the source gNB. In some cases, this tracked information may help trigger and configure a conditional handover (CHO) procedure.

Figure 8:
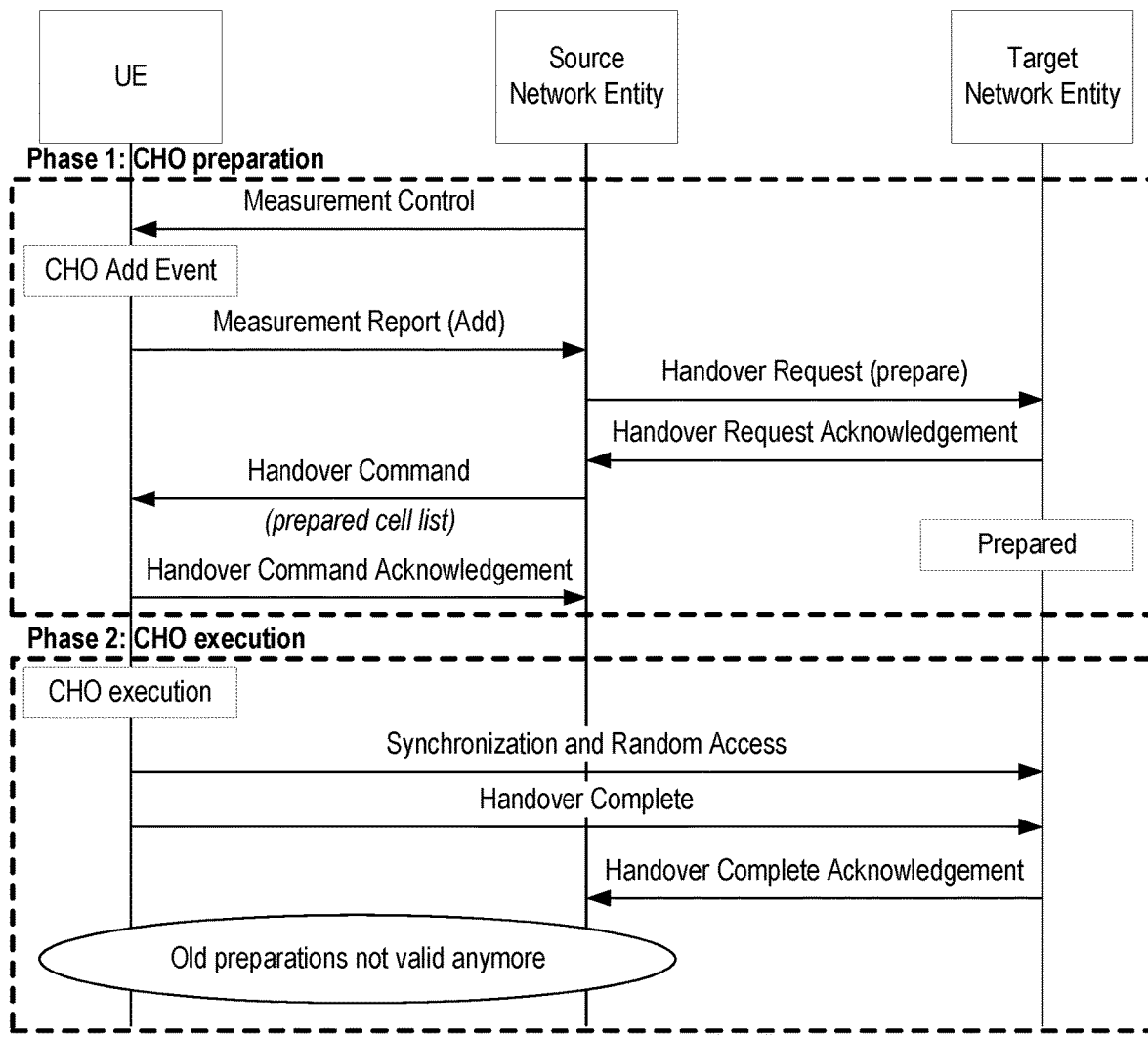
FIG. 8 depicts an example call flow diagram for conditional handover (CHO), in accordance with aspects of the present disclosure.

FIG. 8 shows a call flow diagram 800 for a CHO procedure, based on sensor information obtained at a gNB and predicted path of a UE. In some cases, in a first phase (CHO preparation), when the UE motion points toward a potential handover boundary (e.g., boundary 710 in FIG. 7), a conditional handover (CHO) request may be sent to the target gNB for preparation and a handover command with a prepared cell list may be sent to the UE. Rather than wait for measurement reports from the UE, as in a conventional CHO procedure, the Source gNB in this case may not need to wait for measurement reports from the UE in order to trigger the CHO. In other words, the source gNB can proactively trigger the CHO, since waiting for measurement reports might result in an RLF, as previously discussed. In some cases, the CHO may be limited with fewer cells, since the gNB may know the direction/region the UE is moving to. Without this information, the gNB might be forced to configure a larger number of neighbors in the CHO which can have an negative impact on UE performance (e.g., resulting in additional power consumption to evaluate CHO conditions for neighbors that are not in the UE's path).

In a second phase (CHO execution), the UE may continue measuring the cells in the prepared cell list. Once a CHO trigger condition is met (e.g., in the scenario illustrated by FIG. 7, once the user moves around the corner into a shadow region of the source gNB), the CHO may be executed to the target gNB without disruption (e.g., and avoiding an RLF). In some cases, the CHO procedure described herein may be further enhanced by incorporating Dual Active Protocol Stack (DAPS) for softer handovers.

There are various potential benefits to the various techniques for predicting future path of a UE (and enabling spatially aware cells), as proposed herein. For example, the techniques described herein may help improve call quality and call drop key performance indicators (KPIs), by avoiding RLFs and/or facilitating handovers. The techniques proposed herein may also help in various scenarios, such as when heavy vehicles are going to obstruct a line of sight, wherein gNB will add neighbor cells for CHOs accordingly. The techniques proposed herein may also be used for more accurate beam prediction, based on UE motion within a gNBs own FOV. The techniques may also be extended for a cell selection algorithm, wherein the network can add more neighbor cells based on a velocity of the UE. For example, based on the velocity of the UE, multiple cells along the velocity vector (based on determined direction) can be added for CHO. Such a solution may be particularly valuable in certain scenarios that are intolerant of latency, such as ultra-reliable low latency communications (uRLLC).

In some cases, how readily or soon CHOs are prepared or triggered can be tuned according to QoS (Quality of Service) requirements of UEs. For example, if the QoS of the UE requires high reliability or low latency, the tracking and CHO can be more proactive or vice versa. For example, the tracking and CHO may be tuned so that, in the scenario illustrated by FIG. 7, if the user turns around instead of walking past the building, there will not be a handover triggered, since the CHO is triggered by UE itself. In that case, since the UE will not see a drop of source gNB quality, the UE will stay on strongest cell.

The tracking and CHO may also be tuned to account for likely scenarios, such as two people walking together, at an equal pace, side by side (e.g., and may be indistinguishable based on algorithms described above). In such cases, if the gNB falsely detects one person as the UE user, a prediction based on the second person may still be accurate.

In some cases, time of year may be considered. For example, in the case of changing seasons (e.g., fall season), the foliage of the trees may be less dense and, thus, the 3D visual model may change to adapt the HO boundaries accordingly. In some cases, a camera/IR based solution may have certain advantages over radar or light detection and ranging (LIDAR) based solutions (e.g., since no transmission is involved, which may reduce power consumption of the gNB).

Aspects of the present disclosure may be applicable to Vehicle to Everything (V2X) scenarios, for example, for tracking vehicles and maintaining a reliable V2X communication system.

Figure 9:
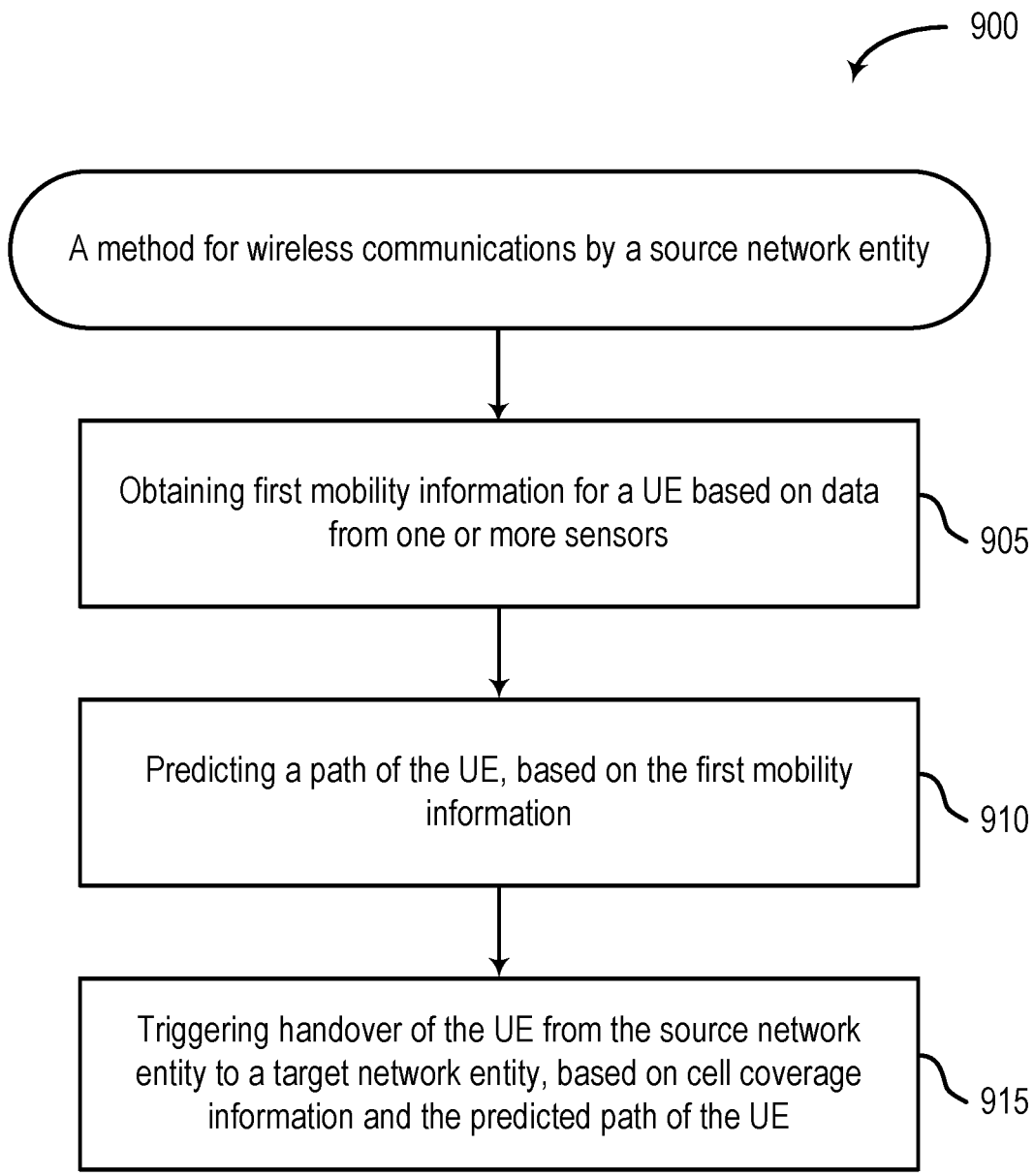
FIG. 9.depicts a method for wireless communications.

An additional advantage of the proposed solution is that the camera/IR feed from gNBs can also be used for surveillance and security purposes, which may be integral for smart city solutions. Example Operations of Entities in a Communications Network Example Operations of a Network Entity FIG. 9 shows a method 900 for wireless communications by a source network entity, such as BS 102 of FIGS. 1 and 3, or a disaggregated base station as discussed with respect to FIG. 2.

Method 900 begins at 905 with obtaining first mobility information for a UE based on data from one or more sensors. In some cases, the operations of this step refer to, or may be performed by, mobility information processing circuitry as described with reference to FIG. 10.

Method 900 then proceeds to step 910 with predicting a path of the UE, based on the first mobility information. For example, the UE path may be based on a trajectory (e.g., speed and direction) of the UE, using any suitable algorithm. In some cases, the operations of this step refer to, or may be performed by, UE path prediction circuitry as described with reference to FIG. 10.

Method 900 then proceeds to step 915 with triggering handover of the UE from the source network entity to a target network entity, based on cell coverage information and the predicted path of the UE. For example, if the predicted path has the UE traveling behind a building where a source serving gNB (or other network entity) does not have coverage, the UE could be handed over to a target gNB. In some cases, the operations of this step refer to, or may be performed by, handover management circuitry as described with reference to FIG. 10.

In some aspects, triggering handover of the UE comprises: transmitting a handover request to the target network entity; receiving acknowledgment of the handover request from the target network entity; and after receiving the acknowledgment, transmitting a handover command for the UE with a list of cells. In some aspects, the one or more sensors are co-located with the source network entity.

In some aspects, the one or more sensors comprise at least one of an image sensor, an IR sensor, or a radar-based sensor; and the first mobility information is based on sensor data from the at least one of an image sensor or IR sensor. For example, the UE may be tracked within a field of view, based on image data, to determine a trajectory of the UE. In some aspects, the method 900 further includes obtaining a 3D model associated with (e.g., generated for as described herein) a FOV of the source network entity. In some aspects, the method 900 further includes creating a current FOV by super-imposing the image data onto the 3D model.

In some aspects, obtaining the 3D model comprises fetching map data, from a location server, via an API. In some aspects, obtaining the 3D model comprises generating the 3D model based on data from the one or more sensors.

In some aspects, the method 900 further includes refining the 3D model based on at least one of: a machine learning algorithm based on UE behaviors (e.g., if user behavior indicates an object or impediment, based on movement, the 3D model could be updated to indicate such); or image data from one or more neighboring network entities.

In some aspects, the method 900 further includes exchanging cell coverage information with one or more neighboring network entities. In some aspects, the method 900 further includes determining, based on the exchanged cell coverage information, boundaries within the 3D model for potential handovers of the UE from the source network entity to one or more neighboring network entities. For example, the exchanged cell coverage information may be analyzed to indicate overlapping features that are indicative of boundaries.

In some aspects, the first mobility information comprises: an estimated position of the UE an estimated velocity of the UE. In some aspects, the method 900 further includes calculating second mobility information for the UE based on a RL. In some aspects, the second mobility information comprises at least one of: an estimated position of the UE, an estimated direction of motion of the UE, an estimated velocity of the UE, or an estimated distance between the UE and the source network entity. In some aspects, the second mobility information is calculated using at least one of: beam switches at the network entity, TDOA information, changes in UL received power from the UE, Doppler shifts in UL reception frequency, or beam direction information.

In some aspects, the method 900 further includes using the second mobility information to correlate a moving entity in the current FOV with the UE by comparing the second mobility information with mobility information for the moving entity. In some aspects, the method 900 further includes determining that the UE is moving toward a potential handover boundary based on the correlation of the moving entity with the UE. In some aspects, the method 900 further includes, based on determining that the UE is moving toward a potential handover boundary, triggering the handover of the UE to a target network entity.

Figure 10:
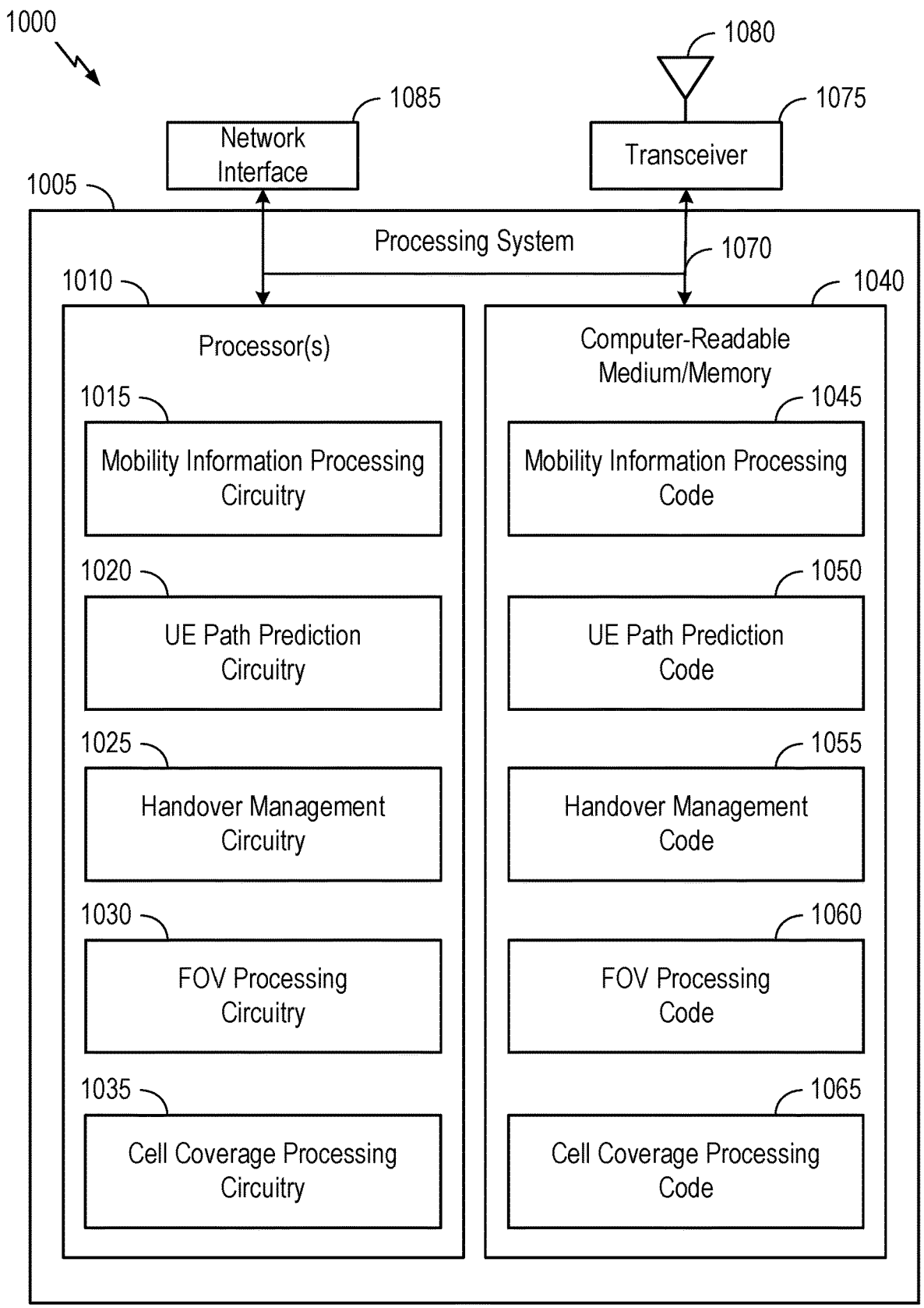
FIG. 10 depicts aspects of an example communications device.

In one aspect, method 900, or any aspect related to it, may be performed by an apparatus, such as communications device 1000 of FIG. 10, which includes various components operable, configured, or adapted to perform the method 900. Communications device 1000 is described below in further detail.

Note that FIG. 9 is just one example of a method, and other methods including fewer, additional, or alternative steps are possible consistent with this disclosure.

Example Communications Device

FIG. 10 depicts aspects of an example communications device 1000. In some aspects, communications device 1000 is a network entity, such as BS 102 of FIGS. 1 and 3, or a disaggregated base station as discussed with respect to FIG. 2.

The communications device 1000 includes a processing system 1005 coupled to the transceiver 1075 (e.g., a transmitter and/or a receiver) and/or a network interface 1085. The transceiver 1075 is configured to transmit and receive signals for the communications device 1000 via the antenna 1080, such as the various signals as described herein. The network interface 1085 is configured to obtain and send signals for the communications device 1000 via communication link(s), such as a backhaul link, midhaul link, and/or fronthaul link as described herein, such as with respect to FIG. 2. The processing system 1005 may be configured to perform processing functions for the communications device 1000, including processing signals received and/or to be transmitted by the communications device 1000.

The processing system 1005 includes one or more processors 1010. In various aspects, one or more processors 1010 may be representative of one or more of receive processor 338, transmit processor 320, TX MIMO processor 330, and/or controller/processor 340, as described with respect to FIG. 3. The one or more processors 1010 are coupled to a computer-readable medium/memory 1040 via a bus 1070. In certain aspects, the computer-readable medium/memory 1040 is configured to store instructions (e.g., computer-executable code) that when executed by the one or more processors 1010, cause the one or more processors 1010 to perform the method 900 described with respect to FIG. 9, or any aspect related to it. Note that reference to a processor of communications device 1000 performing a function may include one or more processors 1010 of communications device 1000 performing that function.

In the depicted example, the computer-readable medium/memory 1040 stores code (e.g., executable instructions), such as mobility information processing code 1045, UE path prediction code 1050, handover management code 1055, FOV processing code 1060, and cell coverage processing code 1065. Processing of the mobility information processing code 1045, UE path prediction code 1050, handover management code 1055, FOV processing code 1060, and cell coverage processing code 1065 may cause the communications device 1000 to perform the method 900 described with respect to FIG. 9, or any aspect related to it.

The one or more processors 1010 include circuitry configured to implement (e.g., execute) the code stored in the computer-readable medium/memory 1040, including circuitry such as mobility information processing circuitry 1015, UE path prediction circuitry 1020, handover management circuitry 1025, FOV processing circuitry 1030, and cell coverage processing circuitry 1035. Processing with mobility information processing circuitry 1015, UE path prediction circuitry 1020, handover management circuitry 1025, FOV processing circuitry 1030, and cell coverage processing circuitry 1035 may cause the communications device 1000 to perform the method 900 as described with respect to FIG. 9, or any aspect related to it.

Various components of the communications device 1000 may provide means for performing the method 900 as described with respect to FIG. 9, or any aspect related to it. Means for transmitting, sending or outputting for transmission may include transceivers 332 and/or antenna(s) 334 of the BS 102 illustrated in FIG. 3 and/or the transceiver 1075 and the antenna 1080 of the communications device 1000 in FIG. 10. Means for receiving or obtaining may include transceivers 332 and/or antenna(s) 334 of the BS 102 illustrated in FIG. 3 and/or the transceiver 1075 and the antenna 1080 of the communications device 1000 in FIG. 10.

According to some aspects, mobility information processing circuitry 1015 obtains first mobility information for a UE based on data from one or more sensors. According to some aspects, UE path prediction circuitry 1020 predicts a path of the UE, based on the first mobility information. According to some aspects, handover management circuitry 1025 triggers handover of the UE from the source network entity to a target network entity, based on cell coverage information and the predicted path of the UE.

In some aspects, triggering handover of the UE comprises: handover management circuitry 1025 transmitting a handover request to the target network entity; handover management circuitry 1025 receiving acknowledgment of the handover request from the target network entity; and after receiving the acknowledgment, handover management circuitry 1025 transmitting a handover command for the UE with a list of cells. In some aspects, the one or more sensors are co-located with the source network entity. In some aspects, the one or more sensors comprise at least one of an image sensor, an IR sensor, or a radar-based sensor; and the first mobility information is based on image data from the at least one of an image sensor or IR sensor.

According to some aspects, FOV processing circuitry 1030 obtains a 3D model associated with a FOV of the source network entity. In some examples, FOV processing circuitry 1030 creates a current FOV by super-imposing the image data onto the 3D model. In some aspects, obtaining the 3D model comprises fetching map data, from a location server, via an API. In some aspects, obtaining the 3D model comprises generating the 3D model based on data from the one or more sensors. In some examples, FOV processing circuitry 1030 refines the 3D model based on at least one of: a machine learning algorithm based on UE behaviors; or image data from one or more neighboring network entities.

According to some aspects, cell coverage processing circuitry 1035 exchanges cell coverage information with one or more neighboring network entities. In some examples, cell coverage processing circuitry 1035 determines, based on the exchanged cell coverage information, boundaries within the 3D model for potential handovers of the UE from the source network entity to one or more neighboring network entities. In some aspects, the first mobility information comprises: an estimated position of the UE an estimated velocity of the UE.

In some examples, mobility information processing circuitry 1015 calculates second mobility information for the UE based on a RL. In some aspects, the second mobility information comprises at least one of: an estimated position of the UE, an estimated direction of motion of the UE, an estimated velocity of the UE, or an estimated distance between the UE and the source network entity. In some aspects, the second mobility information is calculated using at least one of: beam switches at the network entity, TDOA information, changes in UL received power from the UE, Doppler shifts in UL reception frequency, or beam direction information. In some examples, mobility information processing circuitry 1015 uses the second mobility information to correlate a moving entity in the current FOV with the UE by comparing the second mobility information with mobility information for the moving entity. In some examples, mobility information processing circuitry 1015 determines that the UE is moving toward a potential handover boundary based on the correlation of the moving entity with the UE.

In some examples, based on determining that the UE is moving toward a potential handover boundary, handover management circuitry 1025 triggers the handover of the UE to a target network entity.

Example Clauses

Implementation examples are described in the following numbered clauses:

Clause 1: A method for wireless communications by a source network entity, comprising: obtaining first mobility information for a UE based on data from one or more sensors; predicting a path of the UE, based on the first mobility information; and triggering handover of the UE from the source network entity to a target network entity, based on cell coverage information and the predicted path of the UE.

Clause 2: The method of Clause 1, wherein triggering handover of the UE comprises: transmitting a handover request to the target network entity; receiving acknowledgment of the handover request from the target network entity; and after receiving the acknowledgment, transmitting a handover command for the UE with a list of cells.

Clause 3: The method of any one of Clauses 1 and 2, wherein the one or more sensors are co-located with the source network entity.

Clause 4: The method of any one of Clauses 1-3, wherein: the one or more sensors comprise at least one of an image sensor, an IR sensor, or a radar-based sensor; and the first mobility information is based on image data from the at least one of an image sensor or IR sensor.

Clause 5: The method of Clause 4, further comprising: obtaining a 3D model associated with a FOV of the source network entity; and creating a current FOV by super-imposing the image data onto the 3D model.

Clause 6: The method of Clause 5, wherein obtaining the 3D model comprises fetching map data, from a location server, via an API.

Clause 7: The method of Clause 5, wherein obtaining the 3D model comprises generating the 3D model based on data from the one or more sensors.

Clause 8: The method of Clause 5, further comprising: refining the 3D model based on at least one of: a machine learning algorithm based on UE behaviors; or image data from one or more neighboring network entities.

Clause 9: The method of Clause 5, further comprising: exchanging cell coverage information with one or more neighboring network entities; and determining, based on the exchanged cell coverage information, boundaries within the 3D model for potential handovers of the UE from the source network entity to one or more neighboring network entities.

Clause 10: The method of Clause 5, wherein the first mobility information comprises: an estimated position of the UE an estimated velocity of the UE.

Clause 11: The method of Clause 10, further comprising: calculating second mobility information for the UE based on a RL.

Clause 12: The method of Clause 11, wherein the second mobility information comprises at least one of: an estimated position of the UE, an estimated direction of motion of the UE, an estimated velocity of the UE, or an estimated distance between the UE and the source network entity.

Clause 13: The method of Clause 12, wherein the second mobility information is calculated using at least one of: beam switches at the network entity, TDOA information, changes in UL received power from the UE, Doppler shifts in UL reception frequency, or beam direction information.

Clause 14: The method of Clause 11, further comprising: using the second mobility information to correlate a moving entity in the current FOV with the UE by comparing the second mobility information with mobility information for the moving entity.

Clause 15: The method of Clause 14, further comprising: determining that the UE is moving toward a potential handover boundary based on the correlation of the moving entity with the UE; and based on determining that the UE is moving toward a potential handover boundary, triggering the handover of the UE to a target network entity.

Clause 16: A processing system, comprising: a memory comprising computer-executable instructions; one or more processors configured to execute the computer-executable instructions and cause the processing system to perform a method in accordance with any one of Clauses 1-15.

Clause 17: A processing system, comprising means for performing a method in accordance with any one of Clauses 1-15.

Clause 18: A non-transitory computer-readable medium comprising computer-executable instructions that, when executed by one or more processors of a processing system, cause the processing system to perform a method in accordance with any one of Clauses 1-15.

Clause 19: A computer program product embodied on a computer-readable storage medium comprising code for performing a method in accordance with any one of Clauses 1-15.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. §112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a source base station, comprising:

obtaining first mobility information for a user equipment (UE) based on sensor data from one or more sensors, wherein the one or more sensors comprise at least one of an image sensor, an infrared (IR) sensor, or a radar-based sensor;

obtaining a three dimensional (3D) model associated with a field of view (FOV) of the source base station, wherein the FOV is based on the one or more sensors incorporated into the source base station, wherein obtaining the 3D model comprises at least one of fetching map data from a location server or generating the 3D model based on the sensor data from the one or more sensors;

creating a current FOV by super-imposing the sensor data onto the 3D model;

predicting a path of the UE, based on the first mobility information and the current FOV; and triggering a handover of the UE from the source base station to a target base station, based on cell coverage information and the predicted path of the UE.

2. The method of claim 1, wherein triggering the handover of the UE comprises:
transmitting a handover request to the target base station;
receiving acknowledgment of the handover request from the target base station; and
transmitting a handover command for the UE with a list of cells after receiving the acknowledgment.

3. The method of claim 1, wherein obtaining the 3D model comprises fetching the map data, from the location server, via an application programming interface (API).

4. The method of claim 1, wherein obtaining the 3D model comprises generating the 3D model based on the sensor data from the one or more sensors.

5. The method of claim 1, further comprising refining the 3D model based on at least one of:
a machine learning algorithm based on UE behaviors; or
image data from one or more neighboring base stations.

6. The method of claim 1, further comprising:
exchanging cell coverage information with one or more neighboring base stations; and
determining, based on the exchanged cell coverage information, boundaries within the 3D model for potential handovers of the UE from the source base station to the one or more neighboring base stations.

7. The method of claim 1, wherein the first mobility information comprises: an estimated position of the UE and an estimated velocity of the UE.

8. The method of claim 7, further comprising:
calculating second mobility information for the UE based on a radio link (RL).

9. The method of claim 8, wherein the second mobility information comprises at least one of: an estimated position of the UE, an estimated direction of motion of the UE, an estimated velocity of the UE, or an estimated distance between the UE and the source base station.

10. The method of claim 9, wherein the second mobility information is calculated using at least one of: beam switches at the source base station, time difference of arrival (TDOA) information, changes in uplink (UL) received power from the UE, Doppler shifts in UL reception frequency, or beam direction information.

11. The method of claim 8, further comprising:
using the second mobility information to correlate a moving entity in the current FOV with the UE by comparing the second mobility information with mobility information for the moving entity.

12. The method of claim 11, further comprising:
determining that the UE is moving toward a potential handover boundary based on the correlation of the moving entity with the UE; and
triggering the handover of the UE to the target base station based on the determination that the UE is moving toward the potential handover boundary.

13. A source base station configured for wireless communications, comprising: a memory comprising computer-executable instructions; and one or more processors configured to execute the computer-executable instructions and cause the source base station to:
obtain first mobility information for a user equipment (UE) based on sensor data from one or more sensors, wherein the one or more sensors comprise at least one of an image sensor, an infrared (IR) sensor, or a radar-based sensor;
obtain a three dimensional (3D) model associated with a field of view (FOV) of the source base station, wherein the FOV is based on the one or more sensors incorporated into the source base station, wherein obtaining the 3D model comprises at least one of fetching map data from a location server or generating the 3D model based on the sensor data from the one or more sensors;
create a current FOV by super-imposing the sensor data onto the 3D model;
predict a path of the UE, based on the first mobility information and the current FOV; and
trigger a handover of the UE from the source base station to a target base station, based on cell coverage information and the predicted path of the UE.

14. The source base station of claim 13, wherein to trigger the handover of the UE, the one or more processors are configured to execute the computer-executable instructions and cause the source base station to:
transmit a handover request to the target base station;
receive acknowledgment of the handover request from the target base station; and
after receipt of the acknowledgment, transmit a handover command for the UE with a list of cells.

15. The source base station of claim 13, wherein to obtain the 3D model, the one or more processors are configured to execute the computer-executable instructions and cause the source base station to fetch the map data, from the location server, via an application programming interface (API).

16. The source base station of claim 13, wherein to obtain the 3D model, the one or more processors are configured to execute the computer-executable instructions and cause the source base station to generate the 3D model based on the sensor data from the one or more sensors.

17. The source base station of claim 13, wherein the one or more processors are configured to execute the computer-executable instructions and cause the source base station to refine the 3D model based on at least one of:
a machine learning algorithm based on UE behaviors; or
image data from one or more neighboring network entities.

18. The source base station of claim 13, wherein the one or more processors are configured to execute the computer-executable instructions and cause the source base station to:
exchange cell coverage information with one or more neighboring base stations; and
determine, based on the exchanged cell coverage information, boundaries within the 3D model for potential handovers of the UE from the source base station to the one or more neighboring base stations.

19. The source base station of claim 13, wherein the first mobility information comprises: an estimated position of the UE and an estimated velocity of the UE.

20. The source base station of claim 19, wherein the one or more processors are configured to execute the computer-executable instructions and cause the source base station to:
calculate second mobility information for the UE based on a radio link (RL).

21. The source base station of claim 20, wherein the second mobility information comprises at least one of: an estimated position of the UE, an estimated direction of motion of the UE, an estimated velocity of the UE, or an estimated distance between the UE and the source base station.

22. The source base station of claim 21, wherein to calculate the second mobility information, the one or more processors are configured to execute the computer-executable instructions and cause the source base station to calculate using at least one of: beam switches at the base station, time difference of arrival (TDOA) information, changes in uplink (UL) received power from the UE, Doppler shifts in UL reception frequency, or beam direction information.

23. The source base station of claim 20, wherein the one or more processors are configured to execute the computer-executable instructions and cause the source base station to:
use the second mobility information to correlate a moving entity in the current FOV with the UE by comparing the second mobility information with mobility information for the moving entity.

24. The source base station of claim 23, wherein the one or more processors are configured to execute the computer-executable instructions and cause the source base station to:
determine that the UE is moving toward a potential handover boundary based on the correlation of the moving entity with the UE; and
based on determining that the UE is moving toward the potential handover boundary, trigger the handover of the UE to the target base station.

* * * * *